No. 836,639. PATENTED NOV. 20, 1906.
E. L. DUNN.
CONTACT WHEEL.
APPLICATION FILED FEB. 21, 1906.
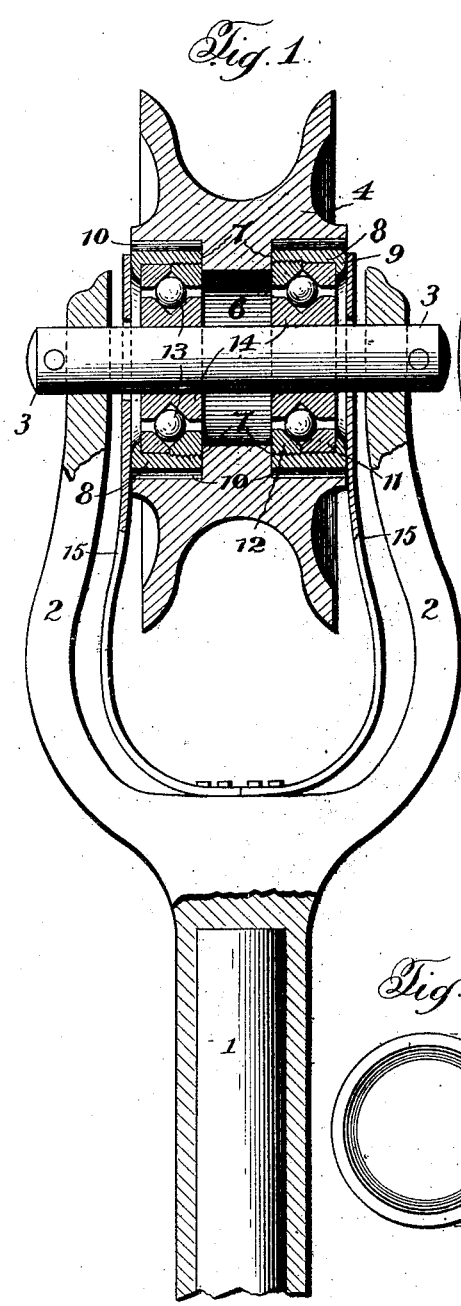
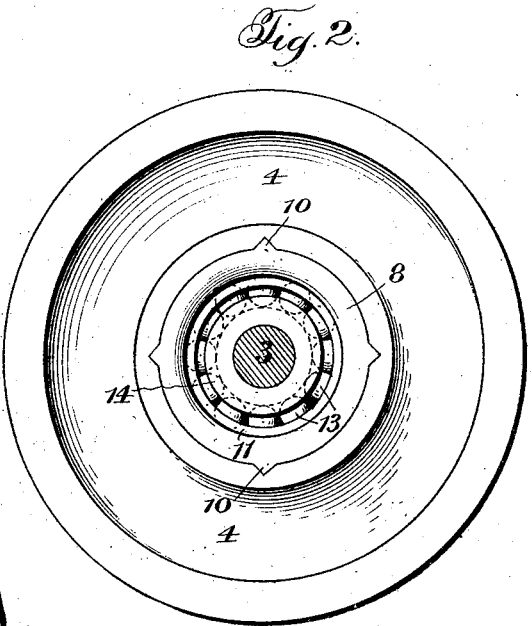
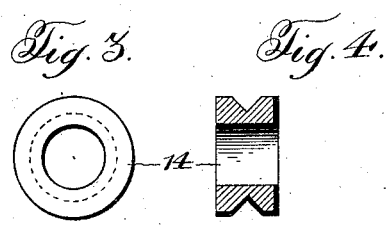
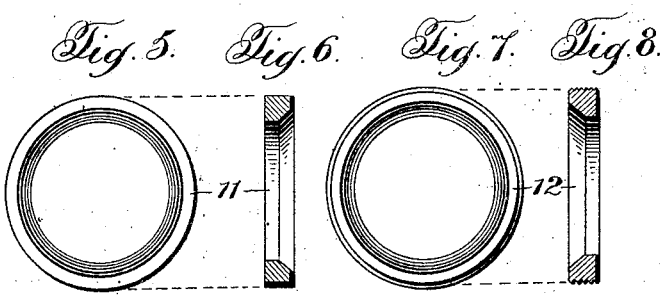
Witnesses
Jas E Hutchinson
A C Hutchinson
Inventor
Edward L. Dunn

UNITED STATES PATENT OFFICE.

EDWARD L. DUNN, OF WASHINGTON, DISTRICT OF COLUMBIA, ASSIGNOR OF ONE-THIRD TO JACOB GERKE, OF BALLSTON, VIRGINIA.

CONTACT-WHEEL.

No. 836,639.      Specification of Letters Patent.      Patented Nov. 20, 1906.

Application filed February 21, 1906. Serial No. 302,221.

*To all whom it may concern:*

Be it known that I, EDWARD L. DUNN, a citizen of the United States, residing at Washington, in the District of Columbia, have invented certain new and useful Improvements in Contact-Wheels, of which the following is a specification.

My invention relates to an improvement in contact-wheels for use in connection with overhead conductors, the object being to provide such wheels with improved antifriction-bearings which may readily be removed and replaced in a new wheel when the old one, by reason of the wear or rough usage, becomes unfit for further use.

With this and other ends in view my invention consists in parts and combinations of parts, as will be more fully explained, and pointed out in the claims.

In the accompanying drawings, Figure 1 is a view of the upper end of a trolley-pole with the wheel therein, the latter being shown in section. Fig. 2 is a view in side elevation of the wheel. Figs. 3 and 4 are views in side elevation and section of the central section of one side bearing. Figs. 5 and 6 are views in side elevation and section of the outer section of the outer ring, and Figs. 7 and 8 are similar views of the inner section of the outer rings.

1 represents a trolley-pole provided at its upper end with the harp 2, carrying the pin 3, on which the trolley-wheel is mounted to rotate. This wheel consists of a body 4, having the usual peripheral groove and provided centrally with a bore 6, considerably larger than the pin 3, on which the wheel is mounted. The bore 6 is not of the same diameter throughout its length, but is somewhat reduced at its center, so as to form shoulders 7, against which the bearings rest.

Each wheel has two antifriction-bearings, and as they are alike a description of one will be sufficient. Each bearing comprises an outer ring 8, having an inwardly-projecting flange 9 on its outer end and one or more V-shaped ribs 10, extending transversely across its outer face. These ribs are adapted to fit within correspondingly-shaped recesses formed in the body of the wheel, as clearly shown in Fig. 2, and lock the bearings in place. The inner surface of the ring 8 adjacent to the flange 9 is smooth to receive the half-bearing 11, which may be pushed into place, while the remaining portion of the inner surface is threaded to receive the threaded half-bearing 12. Each half-bearing 11 and 12 is provided with a beveled edge, so that the two when assembled and locked within the ring 8, as above described, form a V-shaped raceway, in which the steel balls or spheres 13 rest and move. Located within the two half-bearings 11 and 12 is the cylindrical hub 14, provided with a centrally-located V-shaped peripheral groove, which forms the inner raceway for the balls 13. In assembling this bearing the half-bearing 11 is first pushed into position against flange 9 and the hub 14 placed within said half-bearing. The balls 13 are then dropped into the raceway and all the parts locked in place by screwing home the half-bearing 12. The two bearings thus constructed and assembled are forced into their respective seats within the bore on opposite sides of the wheel.

It has been found in actual practice that the frictional contact between the rings 8 and wheel is sufficient to retain the bearings in place; but as the wheel is carried in the harp of the trolley-pole accidental displacement of either bearing is absolutely prevented. The wheel thus constructed is mounted on the pin 3, removably secured to the upper end of the harp 2, and the current is conveyed to the pole or to conductors in or on the pole by the springs 15, which latter bear at their upper ends against the outer faces of the rings 8 and are secured at their lower ends to the pole.

The space 6 within the bore of the wheel forms a chamber, in which graphite is packed, and as the wheel is warmed up by the passage of the current this graphite softens and enters the ball-races in sufficient quantities to keep all the moving surfaces well lubricated.

The pin 3 may be angular in cross-section and pass through correspondingly-shaped openings in the hubs 14 of the bearings, so as to hold the latter against rotation; but I prefer to make it cylindrical and have it fit the hubs sufficiently tight to prevent any rotation of the latter.

This construction, by reason of the lack of friction, increases the life of the wheel; but when the latter becomes unfit for further use, by reason of wear or other damage incidental to the rough usage to which they are subjected, the bearings can be removed intact and readily inserted in other wheels without the use of any tools whatever.

It is evident that other forms of removable bearings may be employed in lieu of those shown. Hence I would have it understood that I do not confine myself to the details of the bearings, but consider myself at liberty to make such changes as fairly fall within the spirit and scope of my invention.

Having thus described my invention, what I claim is—

1. The combination with a wheel having a central bore, and an annular projection centrally within said bore, of two removable antifriction-bearings separately assembled, and an outer ring inclosing and forming a part of each bearing, the said ring having a flange at its outer end to secure the parts against outward movement, the annular projection in the bore of the wheel holding the bearings against inward movement.

2. The combination with a wheel having a central bore and a solid annular projection within the bore, of two removable antifriction-bearings separately assembled, and an outer ring inclosing each of said bearings and forming a part thereof, the said bearings being located within the bore on opposite sides of the annular projection, the latter serving to space the bearings and form a lubricant-chamber.

3. The combination with a wheel having a central bore, of two antifriction-bearings each separately assembled, and an outer ring inclosing each of said bearings and forming a part thereof, the said outer ring having external ribs engaging recesses in the wheel, the said bearings being located within the bore at the opposite ends thereof.

In testimony whereof I have signed my name to this specification in the presence of two subscribing witnesses.

EDWARD L. DUNN.

Witnesses:
  JAS. E. HITCHINSON,
  JNO. H. KING.